Jan. 24, 1950     J. SCHULTES ET AL     2,495,646
LEVEL
Filed Feb. 28, 1948
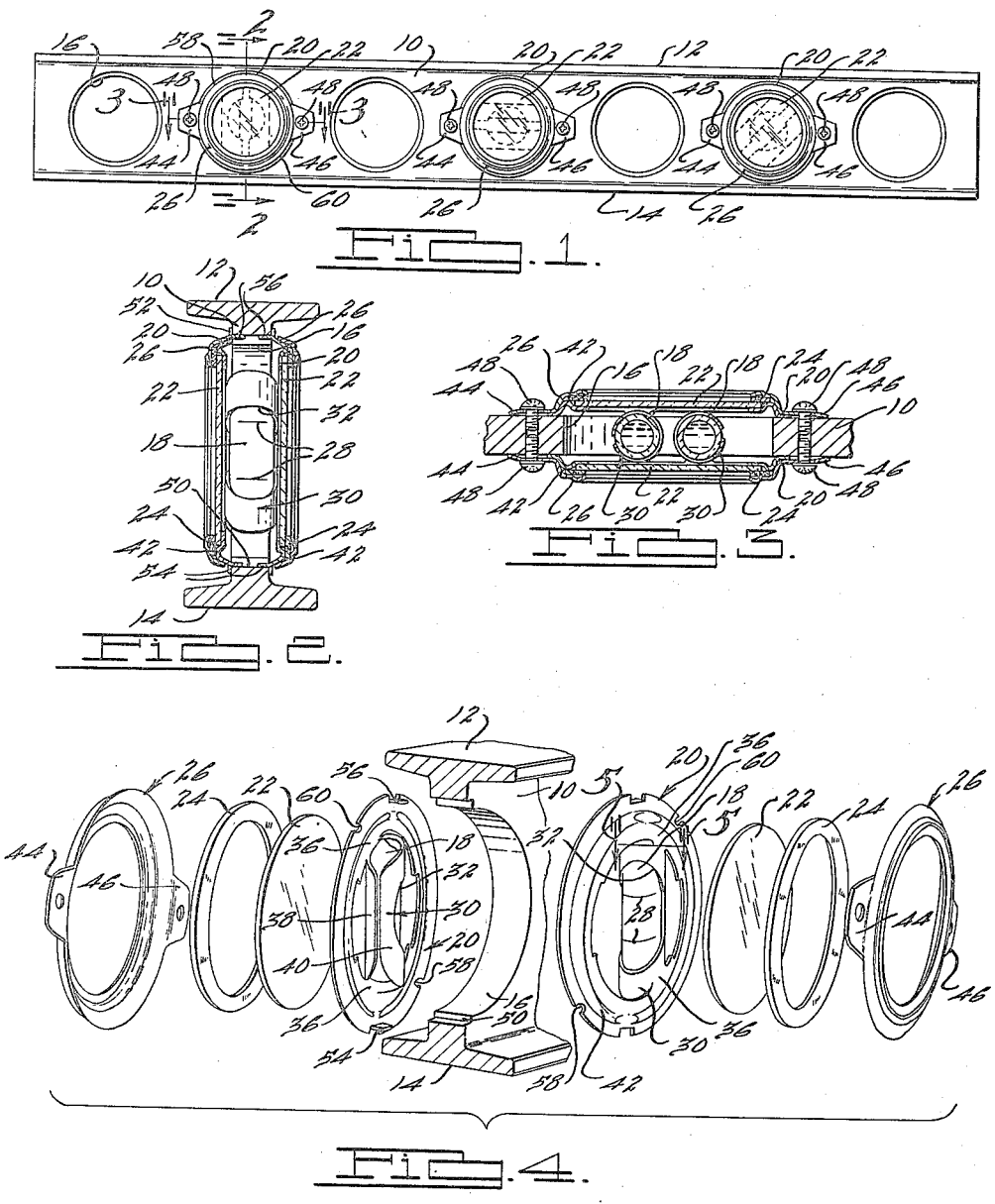
INVENTORS.
John Schultes.
Vincent Schultes.
BY
Harness, Dickey & Pierce
ATTORNEYS.

Patented Jan. 24, 1950

2,495,646

UNITED STATES PATENT OFFICE 2,495,646

LEVEL

John Schultes and Vincent Schultes,
Detroit, Mich.

Application February 28, 1948, Serial No. 11,935

3 Claims. (Cl. 33—211)

This invention relates broadly to spirit levels.

An important object of the present invention is to provide a spirit level in which the parts are uniquely constructed and arranged so that the spirit tubes or vials are securely and accurately positioned and held in precise predetermined angular relation with respect to the work-engaging surfaces of the level.

Another object of the invention is to provide a novel spirit level assembly having a plurality of spirit tubes or vials arranged at different predetermined angles with respect to the work-engaging surface of the level body.

Still another object of the invention is to provide a novel spirit level assembly wherein the various spirit tubes or vials are interchangeable on the level body.

Yet another object of the present invention is to provide a unique spirit level assembly in which the spirit tubes or vials can be replaced and accurately positioned by inexperienced lay workers.

A further object of the invention is to provide a novel spirit level assembly wherein the spirit vials are protected by transparent windows or closures which are uniquely mounted and correlated with other parts of the assembly to prevent dust or dirt from gaining access to the vials.

A still further object of the invention is to provide a spirit level wherein the transparent windows or closures are uniquely supported to minimize possibility of breakage.

Other objects and advantages of the invention will be apparent during the course of the following description.

In the drawing forming a part of this specification and wherein like numerals are employed to designate like parts of the same, Fig. 1 is a side elevational view of a level embodying the invention;

Fig. 2 is an enlarged, transverse sectional view taken on the line 2—2 of Fig. 1;

Fig. 3 is an enlarged, fragmentary, longitudinal sectional view taken on the line 3—3 of Fig. 1;

Fig. 4 is an exploded perspective view showing a sectional fragmentary portion of the level body and the various parts which make up a vial assembly; and Fig. 5 is a fragmentary, transverse sectional view taken on the line 5—5 of Fig. 4.

In the drawing wherein for the purpose of illustration is shown a preferred embodiment of the invention, the numeral 10 designates a level body which preferably is generally in the form of an I-beam. The body 10, can be made of any suitable material; however, we prefer to use a magnesium or aluminum alloy since these metals are strong and rigid but at the same time are exceedingly light in weight. Moreover, metal bodies of this type can be formed accurately and relatively inexpensively by conventional extruding or rolling operations. Also metal bodies are preferable to wood bodies since metal will not warp and render the instrument inaccurate. Further, it will be readily apparent that the I-beam shape of the body 10 affords adequate strength so that the level will withstand rough treatment and abuse to which it frequently is subjected in use.

The opposite flange surfaces 12 and 14 of the body 10 are adapted to engage the work to be tested, and these surfaces are milled so that they are exactly flat and precisely parallel. It is important that the work-engaging surfaces 12 and 14 be accurately shaped since they are used as reference points for adjusting the level vials.

Vial assemblies hereinafter described in detail, are mounted in the intermediate web portion of the body 10 and the projecting flanges at the opposite longitudinal edges of the body extend beyond and protect the vial assemblies. The flanges protect the vial assemblies when the level is laid on its side and they protect the vials from being crushed if the level is inadvertently stepped on or if relatively heavy tools or materials are carelessly dropped on or laid across the level.

According to the present invention, the body 10 is equipped with a plurality of vial assemblies which usually are disposed at different predetermined angles with respect to the work-engaging surfaces 12 and 14. In the form of the invention here shown by way of illustration, the level is provided with three vial assemblies. One vial assembly is disposed vertically or at right angles with respect to the work-engaging surfaces 12 and 14; another vial assembly is disposed horizontally or parallel to the work-engaging surfaces; and the other vial assembly is disposed at 45° with respect to the work-engaging surfaces. It will be readily appreciated however, that levels adapted for special purposes may have any selected number of vial assemblies and that the assemblies may be disposed at various angles according to the exigencies of the particular situation. For example, pavers' levels preferably are equipped with a vial assembly in which the vials are disposed at an angle of exactly 2° with respect to the work-engaging surfaces 12 and 14 in order to measure quickly and accurately the drainage pitch of roads, pavements, sidewalks, and the like.

It is contemplated that the body 10 be made in various lengths, and it will be readily apparent that the vial assemblies of the different levels will be spaced various distances apart depending on the length of the body. To this end, the web portion of the body 10 is formed with a plurality of equispaced holes 16 and all of the holes are of the same diameter. These holes 16 serve a double function in the combination in that they lighten the total weight of the level and also provide mountings for the vial assemblies. By making all of the holes the same size and spacing them equidistantly, the level bodies can be cut in the desired length from preformed stock material. As a result, standardization of parts is possible, manufacturing costs are maintained at a minimum and the ultimate purchaser obtains maximum value at minimum cost.

Each vial assembly is composed of two subassemblies which are identical and are mounted at opposite sides of the level body 10. Each subassembly comprises a vial 18, a vial holder 20, a transparent closure or window 22, a gasket 24, and a cover 26. The various elements of the subassemblies and the manner in which they are combined and correlated with each other and with the body 10 are important features of the instant invention.

The vial 18 is conventional and need not be described in detail. It comprises an elongated fully enclosed glass tube which is partially filled with alcohol or other suitable liquid and has a bubble therein which travels back and forth when the vial is tilted. Preferably, the vial 18 is provided with the usual pair of longitudinally spaced transverse lines 28 which indicate when the bubble is centered exactly in the vial.

The vial holder 20 preferably is made of sheet metal and it may be produced in large quantities by conventional stamping and forming operations. As clearly shown in the drawing, the vial holder 20 is of generally annular shape and is slightly larger in diameter than the openings 16. At one side of the diameter thereof, the vial holder 20 is formed with a laterally disposed sleeve 30 which surrounds and snugly receives the vial 18. An elongated opening 32 is formed in the sleeve 30 facing the center of the vial holder 20, and, as clearly shown in the drawing, the vial 18 is positioned in the sleeve 30 with the bubble indicator marks 28 facing the center of the disk and clearly visible through opening 32.

Before the vial 18 is inserted into sleeve 30, it is coated with a suitable transparent cement 34 (Fig. 5), and after the vial is properly centered and adjusted in the sleeve, the assembled parts are laid aside until the cement hardens. In this connection, it is important to note that at least a portion of the sleeve 30 extends substantially the full length of the vial 18 and that the cement 34 is coated on all portions of the vial which underlie any portion of the sleeve. We have found it important to apply the cement over substantially the entire surface of the vial in order to assure adequate strength. Since levels are used on construction jobs they are subjected to all kinds of abuse, they are frequently dropped on the floor or even several stories from a building. Consequently, they must be capable of withstanding severe shocks and jolts without getting out of adjustment. We have found that if the cement is applied only to the ends of the vial, there is a tendency for the latter to loosen under normal conditions of handling and abuse. However, if the sleeve is fashioned to extend along the full length of the vial and the cement is applied to all portions of the vial which are surrounded by the sleeve, little if any trouble is ever encountered during the life of the level with the vial becoming loose in the holder. Manifestly, it is exceedingly important in a device of this nature to maintain the vial 18 fixed in the holder 20 since the level is rendered inoperative if the vial becomes loose and moves from its properly adjusted position.

While the sleeve 30 may be formed independently and then welded, riveted, or otherwise fastened to the holder 20, we prefer to form it integrally with the holder as shown in the drawing. When the center opening of the annular holder 20 is formed, the central portion of the piece is severed except at the two points 36 (Fig. 4). The flaps 38 and 40 thus formed are then rolled to form the sleeve 30.

The holder 20 also is formed with an annular bead 42 which is arranged concentrically within the periphery of the holder. It will be observed that the bead 42 is on the opposite side of the holder from the sleeve 30. Also, it will be observed that the portion of holder 20 disposed radially within the bead 42 is offset laterally with respect to the outer marginal portion thereof. In practice, the holder is mounted on the body 10 with the sleeve 30 and vial 18 disposed in one of the openings 16 and the inner annular portion of the holder which carries the sleeve 30 is offset sufficiently so that the vial is centered exactly between the opposite sides of the body as shown in Fig. 3.

The closure or window 22 may be made of glass, plastic, or any suitable transparent material. It is generally disk-shaped, fits snugly within the bead 42 so that the latter centers and retains it, and is supported by the inner annular portion of the holder. In use, the window 22 prevents dirt and dust from entering the opening 16 and obscuring the vial 28.

The gasket 24 may be of cork or any other suitable material, and it is interposed between the window 22 and cover 26 to seal the window.

The cover 26 also is generally annular in form and is cupped or dished to fit over the annular bead 42 as shown in Fig. 3. In this connection it will be observed that the inner marginal portion of the cover 26 overlies the gasket 24 to hold the latter pressed tightly against the window and in pressed engagement with the holder 20. Also, it will be observed that the bead 42 provides a bearing for the cover 26. The bead 42 automatically centers the cover 26, and the sloping outer wall of the bead supports the cover so that a blow against the cover will not shatter the window 22.

At diametrically opposite sides of the cover 26 are radial ears 44 and 46, and the terminal portions of the ears are bent downwardly to compensate for the thickness of holder 20. As clearly shown in Fig. 3, the ears project radially beyond the holder and are fastened to the body 10 by screws 48 or the like. By reason of the cupped shape of cover 26, the gasket 24, window 22, and holder 20 are nested within and centered and protected by the cover. Since the cover is fixedly positioned on the body 10 by screws 48, it will hold the outer parts of the assembly properly centered in the opening 16.

As suggested, two of the vial subassemblies hereinabove described in detail are mounted on opposite sides of the body 10 to make a complete vial assembly. As perhaps best shown in Figs. 3 and 4, the holders 20 of the two subassemblies are arranged with the vials side-by-side and with the vial openings 32 in confronting relation according to conventional practice to facilitate use of the device.

In order to make the vials and vial holder subassemblies interchangeable from one level to another or from one position to another on the same level, the holes 16 which accommodate the vial assemblies are formed at diametrically opposed sides thereof with radial guideways 50 and 52. These guideways preferably are formed simultaneously by a broaching operation and they are located in precise angular relation with respect to the work-engaging surfaces 12 and 14. Similarly, the holders 20 are formed at diametrically opposed sides thereof with laterally projecting ears 54 and 56 which fit snugly in respective guideways 50 and 52 and serve to locate the holder accurately in proper angular relation on the body 10.

In practice we prefer to form the ears 54 and 56 by a separate operation after the vials 18 have been assembled in the holders 20, in order to assure accurate positioning of the ears with respect to the particular vial in the holder. In actual practice the vial and holder subassembly is placed in a suitable jig or fixture and adjusted angularly until the bubble in the vial is disposed exactly midway between the two reference marks 28. The two ears 54 and 56 are then punched at opposite sides of the holder. When a holder formed in this manner is assembled on the body 10 with the ears 54 and 56 in the guideways 50 and 52 the vial 18 is positioned and held precisely at the desired angle with respect to the work-engaging surfaces 12 and 14.

In the level shown by way of illustration in the drawing, the slots 50 and 52 are formed at the top and bottom of the first opening 16 which accommodates a vial assembly, the slots 50 and 52 are formed at opposite sides of the second opening 16 which accommodates a vial assembly, and the slots 50 and 52 are formed in diametrically opposed relation and at an angle of 45° with respect to the work-engaging surfaces 12 and 14 in the third opening 16 which receives a vial assembly. Thus, preformed and preassembled vial and vial holder subassemblies may be selected from stock and placed in any one of the three formed openings 16. Unless one or the other of the parts is defective, the vials will be accurately and precisely located when the ears 54 and 56 enter slots 50 and 52.

As best shown in Fig. 1, the outer marginal portion of the holder 20 projects radially beyond the periphery of cover 26, and the periphery of the holder is provided with a pair of diametrically opposed notches 58 and 60 which may be engaged by any suitable tool to adjust the holder angularly behind the cover. Such adjustment usually is unnecessary, but it may be necessary if the ears become bent or twisted, or if for any reason any of the locating parts is inoperative or defective. The adjustment can be made easily and quickly by loosening the screws 48 which hold the cover 26 on the body and then again tightening the screws after the holder has been adjusted. When the screws 48 are tightened, the cover 26 applies sufficient pressure against the holder to prevent the latter from getting out of adjustment under normal conditions of handling and of use.

It is to be understood that the form of the invention herewith shown and described is to be taken as a preferred example of the same and that various changes in the size, shape, and arrangement of parts may be resorted to without departing from the spirit of the invention or the scope of the appended claims.

Having thus described the invention, we claim:

1. In a level construction, a body having an opening therein and a flat work-engaging surface; a vial; a generally annular holder carrying said vial disposed against one side of the body with the vial positioned in said opening, the inner annular portion of the holder which carries the vial being offset away from the body and said holder formed on the outer face thereof with a projecting annular bead; a transparent window overlying said holder, said window fitting snugly within and centered with respect to the opening in said body by said annular bead; and means including an annular cover overlying said window and said holder, said means maintaining said window against the holder and said holder in pressed frictional engagement with the body, the undersurface of said cover being dished and fitting snugly over the annular bead of said holder to maintain the holder centered with respect to the body opening and to prevent dirt and the like from penetrating under said window.

2. The combination as set forth in claim 1 wherein said bead surrounds the window and forms a bearing for the cover which limits movement of the latter toward the body.

3. In a level construction, a body having an opening therein and a flat work-engaging surface; a vial; a holder carrying said vial having an outer marginal portion disposed against said body around said opening with the vial located in said opening, the outer face of said marginal portion formed with a projecting annular bead; an annular cover overlying the marginal portion of said holder and detachably fastened to said body, said cover supported by said bead and coactive therewith to hold the holder in pressed frictional engagement with the body and to maintain the holder centered with respect to the opening in said body; a transparent window interposed between the holder and the cover, said window disposed within and centered by said annular bead; and a gasket of resilient material overlying the peripheral marginal portion of said window and said annular bead and pressed solidly thereagainst by the inner marginal portion of said annular cover.

JOHN SCHULTES.
VINCENT SCHULTES.

REFERENCES CITED

The following references are of record in the file of this patent:

UNITED STATES PATENTS

| Number | Name | Date |
| --- | --- | --- |
| 666,843 | Brownell | Jan. 29, 1901 |
| 742,010 | Davis | Oct. 20, 1903 |
| 875,462 | Rowan | Dec. 31, 1907 |
| 1,025,086 | Harris | Apr. 30, 1912 |
| 1,323,148 | Belleville | Nov. 25, 1919 |
| 1,823,524 | Beecher et al. | Sept. 15, 1931 |
| 2,305,678 | Cravaritis et al. | Dec. 22, 1942 |
| 2,453,091 | Holloway et al. | Nov. 2, 1948 |